United States Patent [19]

Park

[11] Patent Number: 5,357,405
[45] Date of Patent: Oct. 18, 1994

[54] BACKLIGHTING DEVICE FOR LIQUID CRYSTAL DEVICES

[75] Inventor: Jong-ho Park, Suwon, Rep. of Korea

[73] Assignee: Samsung Display Devices Co., Ltd., Kyungki-do, Rep. of Korea

[21] Appl. No.: 142,922

[22] Filed: Oct. 29, 1993

[30] Foreign Application Priority Data

Nov. 13, 1992 [KR] Rep. of Korea .............. 92-22350

[51] Int. Cl.$^5$ .................................. F21V 8/00
[52] U.S. Cl. .......................... 362/31; 362/328; 362/330; 362/297; 362/346; 359/49
[58] Field of Search .......... 359/48, 49, 50; 362/26, 362/27, 31, 327, 328, 330, 331, 333, 297, 346

[56] References Cited

U.S. PATENT DOCUMENTS 2,965,749 12/1960 Hudson ........................ 362/27
4,641,925 2/1987 Gasparaitis et al. ............ 359/49

Primary Examiner—Ira S. Lazarus
Assistant Examiner—Alan Cariaso
Attorney, Agent, or Firm—Leydig, Voit & Mayer

[57] ABSTRACT

A backlighting device for producing a uniform luminance throughout a screen for use in LCD devices includes a semicylindrical concave surface on a light-transmitting top face of a light-guiding plate, lamps installed near two opposed edges of the light-guiding plate, a light-diffusing plate on the top side of the light-guiding plate, a light-reflecting plate attached to the bottom face of the light-guiding plate, and reflecting film patterns between the light-guiding plate and the reflecting plate. The present invention provides for a simpler manufacture of the backlighting devices producing a high and uniform luminance.

3 Claims, 2 Drawing Sheets

BACKLIGHTING DEVICE FOR LIQUID CRYSTAL DEVICES

BACKGROUND OF THE INVENTION

The present invention relates to a backlighting device for liquid crystal devices and, more particularly, to a backlighting device promising a uniform illumination over an overall screen for use in display devices such as a liquid crystal display (LCD) device.

Conventional backlighting devices are disclosed in U.S. Pat. No. 4,974,122 entitled "Compact LCD Luminance" and U.S. Pat. No. 4,937,709 entitled "Backlighting Device for a Liquid Crystal Panel." The backlighting device disclosed in the latter patent has been designed to have smaller reflective film patterns in the central portion and larger patterns at the edges of the panel, to circumvent the non-uniformity of luminance which occurs. The backlighting device for an LCD device of the former patent has a light-guiding plate which is thicker at the edges, where lamps are installed, than at the median portions.

FIGS. 1 and 2 briefly illustrate a conventional backlighting device for use in LCD devices.

Referring to FIG. 1, the conventional backlighting device comprises a light-diffusing plate 1; a light-guiding plate 3 attached to the light-diffusing plate 1; two column-shaped lamps 2 installed at opposing edges of the light-guiding plate; a reflecting plate 4 installed below the light-guiding plate; and reflecting film patterns 5 between the light-guiding plate and the reflecting plate. Light-guiding plate 3 receives light from the lamps through both edges thereof and guides it, so that light can travel through the light-guiding plate while some of light passes through the light-diffusing plate. Also, reflecting plate 4 is for reflecting the scattered part of the light introduced into light-guiding plate 3 onto light-diffusing plate 1. In particular, reflecting film patterns 5 diffusely reflecting the light onto the light-diffusing plate are located on reflecting plate 4. Here, reflecting film patterns 5 are printed with different sizes symmetrically with respect to horizontal and vertical directions extending from the central portion of light-guiding plate 3, as shown in FIG. 2. In other words, reflecting film patterns 5 become larger gradually, in the longitudinal direction from the central portion of light-guiding plate 3 towards two opposite edges on which lamps 2 are not placed. On the contrary, reflecting film patterns 5 become smaller gradually, in the latitudinal direction from the central portion of light-guiding plate 3 the two opposite edges having lamps 2. Since the luminance of light transmitted from lamps 2 varies according to the distance from the lamps, the reflecting film patterns are printed with the biggest sizes for increasing of luminance by means of the greatest light-reflection, on the portions otherwise having the lowest luminance, i.e., on the portions farthest from the lamps. On the contrary, the reflecting film patterns are printed with the smallest sizes for the lowest luminance on the portions having the highest luminance, i.e., on the portions near to the lamps. Accordingly, uniformity of luminance of the overall LCD panels can be achieved.

However, it is very difficult to print the reflecting film patterns symmetrically parallel or perpendicular to the column-shaped lamps from the central portion of light-guiding plate 3 because the sizes of the reflecting film patterns vary and the high precision required.

Also, if the LCD panel is elongated in the vertical direction parallel to the lamps as in FIG. 2, the sizes of the reflecting film patterns must be unfavorably varied for the preservation of the symmetry between reflecting film patterns lest the luminance of the overall panel should be non-uniform.

SUMMARY OF THE INVENTION

To overcome the above drawbacks, it is an object of the present invention to provide a backlighting device producing a high and uniform luminance that is easily manufactured.

To accomplish the above object, the present invention provides a backlighting device for the LCD devices including a light-guiding plate having a light-transmitting top face and a light-transmitting bottom face separated by a predetermined distance comprising a semicylindrical concave portion on the light-transmitting top face of the light-guiding plate; two lamps installed near respective opposed edges of the light-guiding plate perpendicular to the first direction; a light-diffusing plate on the light-transmitting top plate; a reflecting plate attached beneath the light-transmitting bottom plate; and reflecting film patterns between the light-guiding plate and the reflecting plate.

According to the backlighting device of the present invention, a high luminance light without variation can be obtained over all the surface of the light-guiding plate,

BRIEF DESCRIPTION OF THE DRAWINGS

These and other objects, features, aspects and advantages of the present invention will become more apparent from the following detailed description of the present invention when taken in conjunction with the accompanying drawings, in which.

DETAILED DESCRIPTION OF THE INVENTION

A preferred embodiment of a backlighting device according to the present invention will be described, hereinafter, with reference to the attached drawings.

Figure 1:
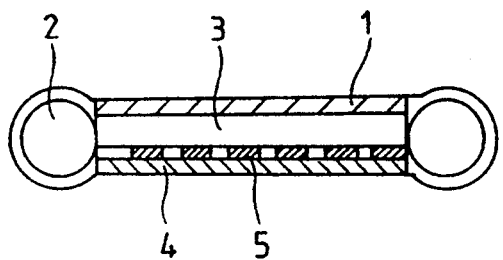
FIG. 1 is a sectional view showing a conventional backlighting device.
Figure 2:
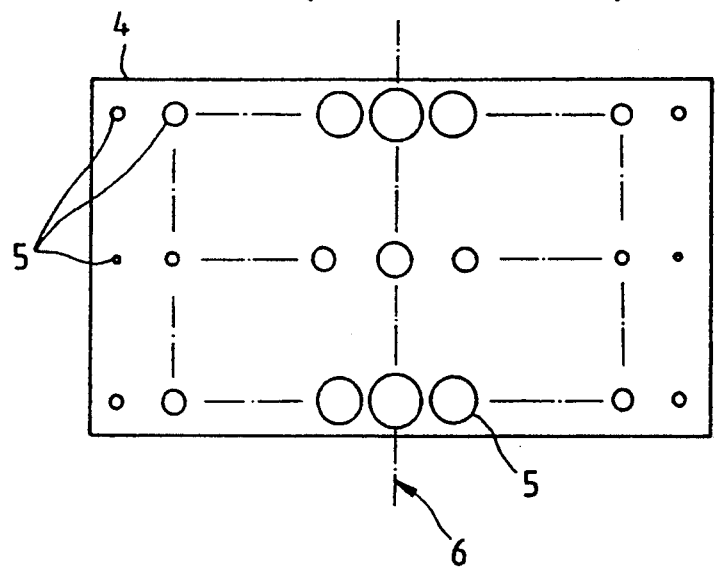
FIG. 2 is a schematic layout diagram showing a reflecting film pattern on a reflecting plate of the conventional backlighting device.
Figure 3:
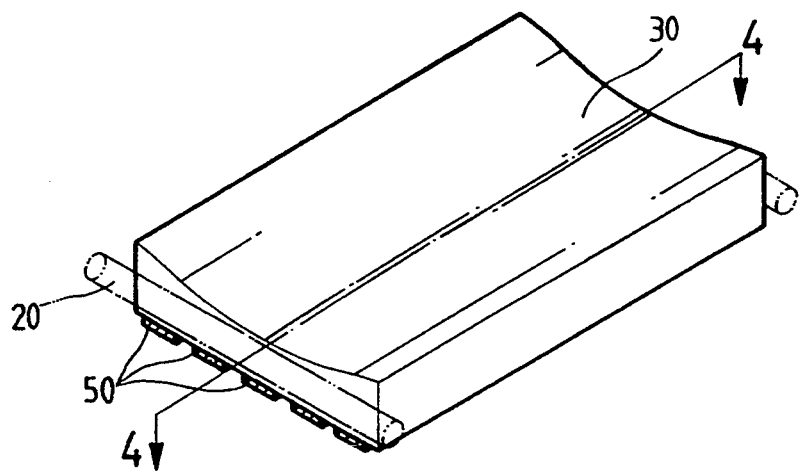
FIG. 3 is a perspective view of a backlighting device in which edges having no lamps are thicker than the inner portion, according to the present invention.
Figure 4:
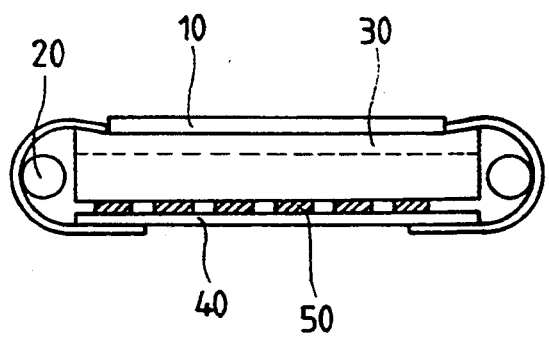
FIG. 4 is a sectional view of the backlighting device of FIG. 3 taken along line 4—4.
Figure 5:
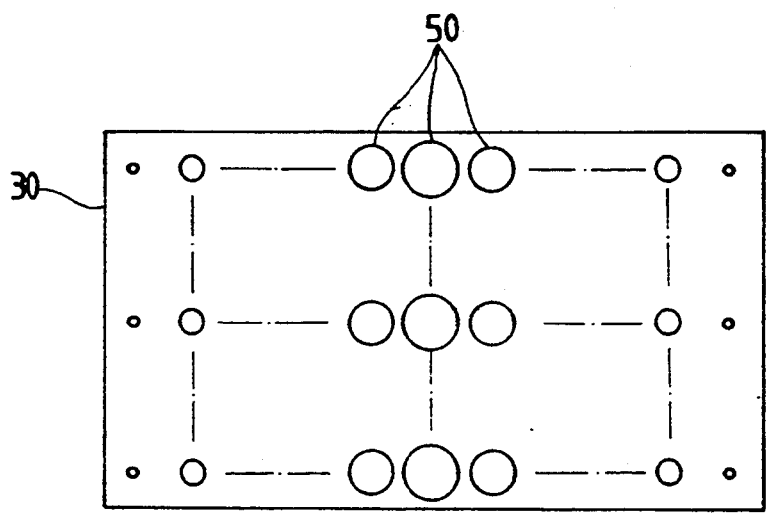
FIG. 5 is a schematic layout diagram showing the reflecting film pattern on the reflecting plate of the backlighting device of FIG. 3.

FIG. 3 is a schematic perspective view of the backlighting device according to the present invention, FIG. 4 is a sectional view of the backlighting device of FIG. 3 along the line 4—4, and FIG. 5 is a layout diagram showing the reflecting pattern of the backlighting device of FIG. 3.

Referring to FIGS. 3 and 4, the backlighting device according to the present invention includes a light-guiding plate 30 of a predetermined thickness including a semicylindrical concave surface about an axis 4—4; two lamps 20 installed near opposite edges of the light-guiding plate perpendicular to the 4—4 direction; a light-diffusing plate 10 contacting the light-guiding plate; a reflecting plate 40 attached to the light-guiding plate opposite the light-diffusing plate; and reflecting film patterns 50 between the light-guiding plate and the reflecting plate. The plurality of reflecting film patterns 50 are spaced at a predetermined interval between light-guiding plate 30 and reflecting plate 40, for diffusely reflecting the incident light of light-guiding plate 30. More preferably, reflecting film patterns 50 are spaced at a uniform interval.

On the other hand, light-guiding plate 30 directs the light of lamps 20 to light-diffusing plate 10 and gradually increases in thickness toward the two opposing edges having no lamps from a median axis therebetween. Here, two opposing edges of light-guiding plate 30 having no lamps are preferably 5-20% thicker than the median axis portion therebetween. Also, light-guiding plate 30 can be preferably manufactured by injection molding or thermal pressing.

In the backlighting device according to the present invention constructed as described above, as the light comes out from lamps 20, the light is introduced to light-guiding plate 30. By the way, almost all of light introduced to light-guiding plate 30 is reflected by reflecting film patterns 50 between reflecting plate 40 and light-guiding plate 30 onto light-diffusing plate 10.

In accordance with an embodiment of the present invention, the reflecting film patterns are located on the median portion between two opposing edges having no lamps in the greatest sizes, to thereby strengthen the reflection of the light from lamps 20. Also, light-guiding plate 30 gradually gets thicker towards the opposing edges where no lamps are present from the median axial portion therebetween, to thereby provide a strong reflection of light at both edges.

Accordingly, to overcome the non-uniformity of the luminance in the conventional backlighting devices, reflecting film patterns 50 between light-guiding plate 30 and reflecting plate 40 are different sizes in the direction perpendicular to the two column-shaped lamps while the patterns are the same sizes in the direction parallel to the column-shaped lamps, which thereby facilitates simpler manufacturing of a high luminance backlighting device.

According to the backlighting device of the present invention as described above, the difference of luminance can be overcome and since it is unnecessary for the reflecting film patterns to be different sizes for overcoming the difference in luminance, simpler manufacture of the backlighting device can be ensured.

While the present invention has been particularly shown and described with reference to particular embodiments thereof, it will be understood by those skilled in the art that various changes in form and details may be effected without departing from the spirit and scope of the invention as defined by the appended claims.

What is claimed is:

1. A backlighting device for use in LCD devices including:
    a light-guiding plate having a light-transmitting first face and an opposed light-transmitting second face, said first face including a semicylindrical concave surface about an axis along a first direction;
    lamps disposed at each of two opposed edges of said light-guiding plate perpendicular to the first direction;
    a light-diffusing plate disposed on said first face of said light-guiding plate;
    a light-reflecting plate disposed on said second face of said light-guiding plate; and
    reflecting film patterns disposed between said light-guiding plate and said light reflecting plate.

2. The backlighting device as claimed in claim 1 wherein said reflecting film patterns have different sizes along a direction parallel to the first direction and a uniform size along a direction perpendicular to the first direction, said reflecting film patterns being spaced apart at a predetermined interval.

3. The backlighting device as claimed in claim 1 wherein said semicylindrical concave surface becomes gradually deeper closer to a median line between two opposed edges of said light-guiding plate at which no lamp is present.

* * * * *